(12) United States Patent
    Iwakami

(10) Patent No.: US 11,110,507 B2
(45) Date of Patent: Sep. 7, 2021

(54) CONVEX PORTION, METHOD OF MANUFACTURING CONVEX PORTION, POSITIONING STRUCTURE

(71) Applicant: Keisuke Iwakami, Kanagawa (JP)

(72) Inventor: Keisuke Iwakami, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 16/520,818

(22) Filed: Jul. 24, 2019

(65) Prior Publication Data

US 2020/0038935 A1    Feb. 6, 2020

(30) Foreign Application Priority Data

Jul. 31, 2018  (JP) .............................. JP2018-143109

(51) Int. Cl.
    *F16B 5/00*     (2006.01)
    *B21D 28/26*   (2006.01)
    *B32B 3/00*     (2006.01)

(52) U.S. Cl.
    CPC ................ *B21D 28/26* (2013.01); *B32B 3/00* (2013.01); *Y10T 428/24182* (2015.01)

(58) Field of Classification Search
    CPC ..... Y10T 428/24182; Y10T 428/24273; Y10T 428/24289; Y10T 428/12264; Y10T 428/12368; Y10T 428/12361; F16B 5/00; F16B 5/07; B21D 19/088
    See application file for complete search history.

(56) References Cited

U.S. PATENT DOCUMENTS

| 4,936,472 A * | 6/1990 | Meier ...................... F16B 5/00 |
| | | 211/194 |
| 7,171,838 B2 * | 2/2007 | Shiokawa .............. B21D 22/02 |
| | | 72/347 |
| 2013/0152656 A1 | 6/2013 | Maeda et al. |

FOREIGN PATENT DOCUMENTS

| JP | 6-238360 | 8/1994 |
| JP | 2000-042641 | 2/2000 |
| JP | 2004-141896 | 5/2004 |
| JP | 2013-126673 | 6/2013 |

(Continued)

OTHER PUBLICATIONS

Machine translation of JP 2000-042641. (Year: 2021).*

*Primary Examiner* — Alexander S Thomas
(74) *Attorney, Agent, or Firm* — Harness, Dickey & Pierce, P.L.C.

(57) ABSTRACT

A convex portion projecting from a plate member includes a base, a convex body, and a guide. The base is part of the plate member. The convex body erects in a cylindrical shape from the base. The guide is at a top end of the convex body. The base includes a first inner circumferential surface, a second inner circumferential surface, and a third inner circumferential surface. The first inner circumferential surface is continuous with an inner circumferential surface of the convex body and extends in a direction opposite to an erecting direction of the convex body. The second inner circumferential surface is continuous with the first inner circumferential surface and intersects the erecting direction of the convex body. The third inner circumferential surface is continuous with the second inner circumferential surface and is larger in diameter than the first inner circumferential surface.

11 Claims, 4 Drawing Sheets

(56) References Cited

FOREIGN PATENT DOCUMENTS

| JP | 2014-177996 | 9/2014 |
| JP | 2018-051608 | 4/2018 |

\* cited by examiner

CONVEX PORTION, METHOD OF MANUFACTURING CONVEX PORTION, POSITIONING STRUCTURE

CROSS-REFERENCE TO RELATED APPLICATION

This patent application is based on and claims priority pursuant to 35 U.S.C. § 119(a) to Japanese Patent Application No. 2018-143109, filed on Jul. 31, 2018, in the Japan Patent Office, the entire disclosure of which is hereby incorporated by reference herein.

BACKGROUND

Technical Field

Aspects of the present disclosure relate to a convex portion, a method of manufacturing the convex portion, and a positioning structure.

Related Art

Generally, a configuration is known of positioning a pair of sheet metals by forming a hole or a concave portion in one of the pair of sheet metals, forming a convex portion that fits into the hole or the concave portion in the other of the pair of sheet metals, and inserting the convex portion into the hole or the concave portion. As an example of a method of manufacturing such a convex portion, a fastening part structure in which a fastening material and a fastened material are fastened is known. The fastening material has, for example, a corrugated burring formed by squeezing a part of the fastening material from the front side to the back side of the fastening material by burring.

SUMMARY

In an aspect of the present disclosure, there is provided a convex portion projecting from a plate member. The convex portion includes a base, a convex body, and a guide. The base is part of the plate member. The convex body erects in a cylindrical shape from the base. The guide is at a top end of the convex body. The base includes a first inner circumferential surface, a second inner circumferential surface, and a third inner circumferential surface. The first inner circumferential surface is continuous with an inner circumferential surface of the convex body and extends in a direction opposite to an erecting direction of the convex body. The second inner circumferential surface is continuous with the first inner circumferential surface and intersects the erecting direction of the convex body. The third inner circumferential surface is continuous with the second inner circumferential surface and is larger in diameter than the first inner circumferential surface.

In another aspect of the present disclosure, there is provided a positioning structure that includes a first plate portion and a second plate portion. The first plate portion is the plate member including the above-described convex portion. The second plate portion includes a hole or a concave portion in which the convex portion fits.

In still another aspect of the present disclosure, there is provided a method of manufacturing a convex portion that includes a base being part of a plate member, a convex body erecting in a cylindrical shape from the base, and a guide at a top end of the convex body, the convex body including a convex base part continuous with the base and a convex top part continuous with the convex base part and the guide. The method includes burring the plate member to form the convex top part and the guide and shearing the plate member to form the convex base part.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

Figure 1:
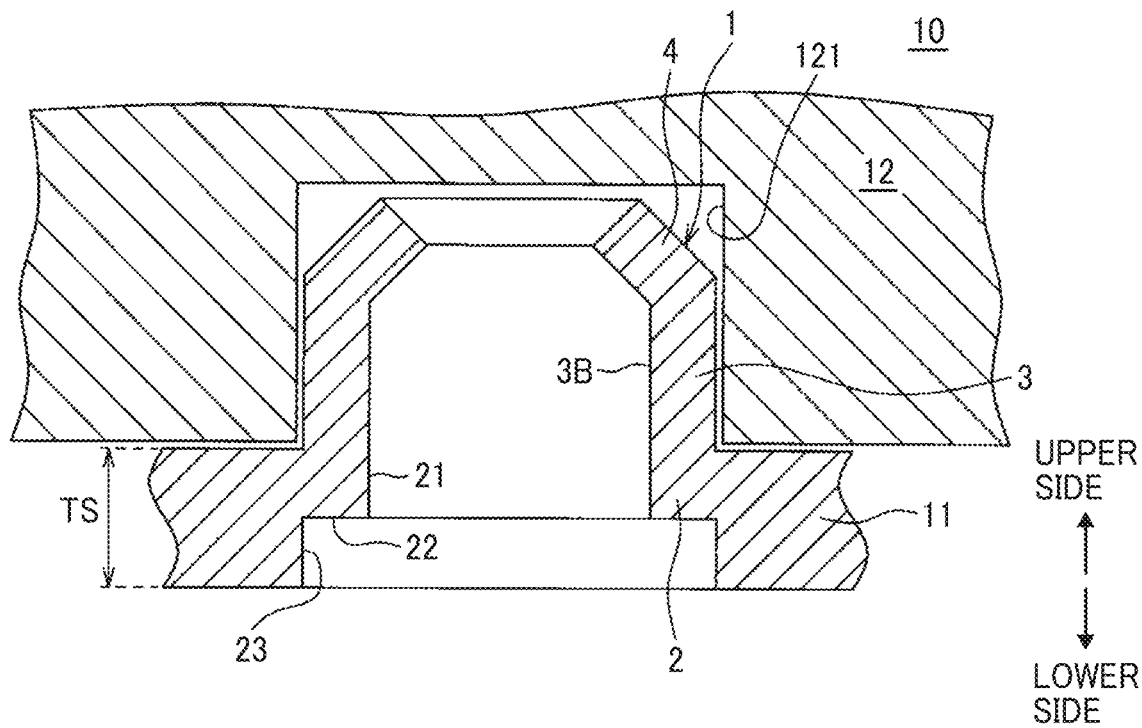
FIG. 1 is a cross-sectional view of a positioning structure according to an embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present disclosure. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Hereinafter, embodiments of the present disclosure will be described with reference to the attached drawings. In the present specification and drawings, constituent elements having substantially the same functional configurations are denoted by the same reference numerals to omit redundant description.

Embodiments of the present disclosure are described below with reference to the attached drawings. Referring now to the drawings, wherein like reference numerals designate identical or corresponding parts throughout the several views thereof, an image forming apparatus according to an embodiment of the present disclosure is described.

Figure 2:
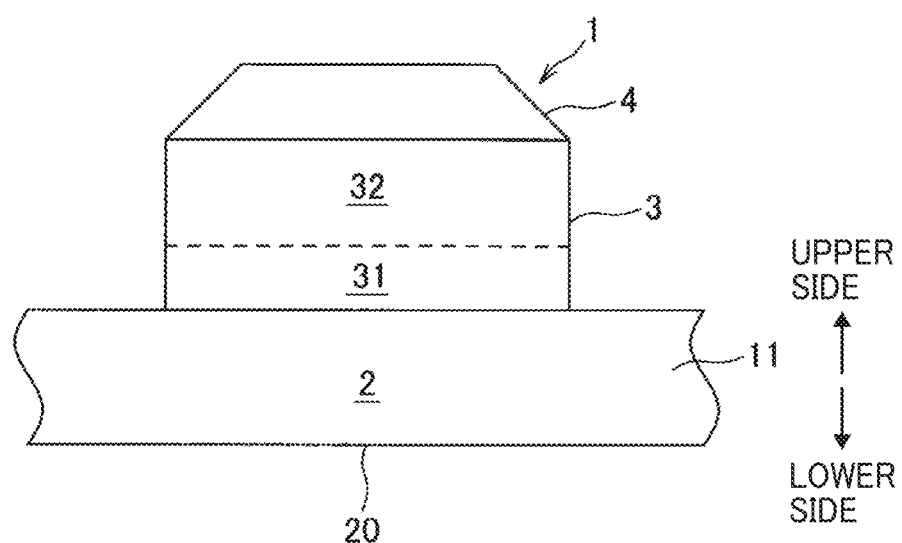
FIG. 2 is a front view of a convex portion of the positioning structure.
Figure 3:
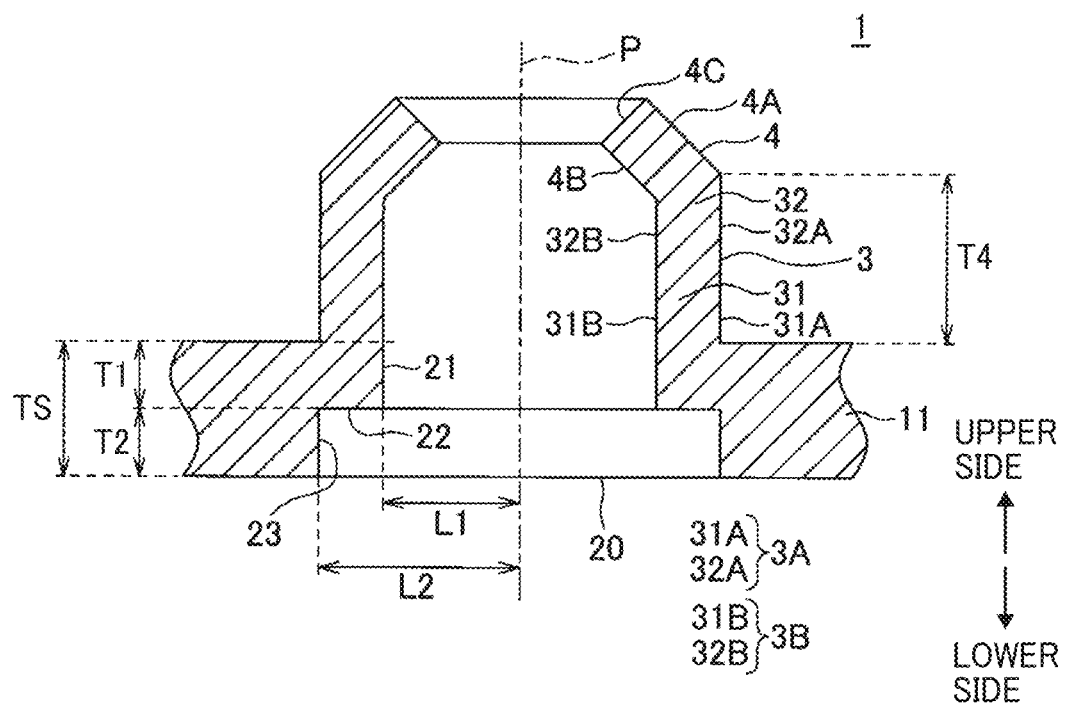
FIG. 3 is a cross-sectional view of the convex portion.

A positioning structure according to an embodiment of the present disclosure is described with reference to FIGS. 1 to 5. As illustrated in FIG. 1, the positioning structure 10 includes a first plate portion 11 (plate member) and a second plate portion 12 and is a structure that positioning the first plate portion 11 and the second plate portion 12. As illustrated in FIG. 2, the first plate portion 11 includes a convex portion 1. The convex portion 1 is formed by sequentially performing burring and shearing as press processing at an arbitrary position of the first plate portion 11. The convex portion 1 includes a base 2 having a predetermined plate thickness TS, a convex body 3 erected in a cylindrical shape from the base 2, and a guide 4 at a top end of the convex body 3. As illustrated in FIG. 3, the convex portion 1 includes a hollow portion penetrating in an erecting direction of the convex body 3. Hereinafter, the thickness direction of the base 2, the erecting direction of the convex body 3 and a direction opposite the erecting direction may be described as a vertical direction. Further, in the vertical direction, the erecting direction and the side on which the guide 4 is disposed with respect to the convex body 3 may be referred to as "upward" and "upper side", and the direction opposite the erecting direction and the side on which the base 2 is disposed with respect to the convex body 3 may be referred to as "downward" and "lower side".

The base 2 is part of the first plate portion 11 as illustrated in FIG. 3. Accordingly, the plate thickness of the first plate portion 11 is equal to the plate thickness of the base 2. The base 2 has, for example, a plate thickness TS of 0.4 mm to 1.6 mm. The burring and the shearing are performed in turn on the base 2 to form the convex body 3 and the guide 4 in which a part of the base 2 extends upward. As illustrated in FIG. 3, the convex body 3 includes a lower body part 31 (convex base part) continuous with an upper side of the base 2 and an upper body part 32 (convex top part) continuous with an upper side of the lower body part 31.

Figure 5A:
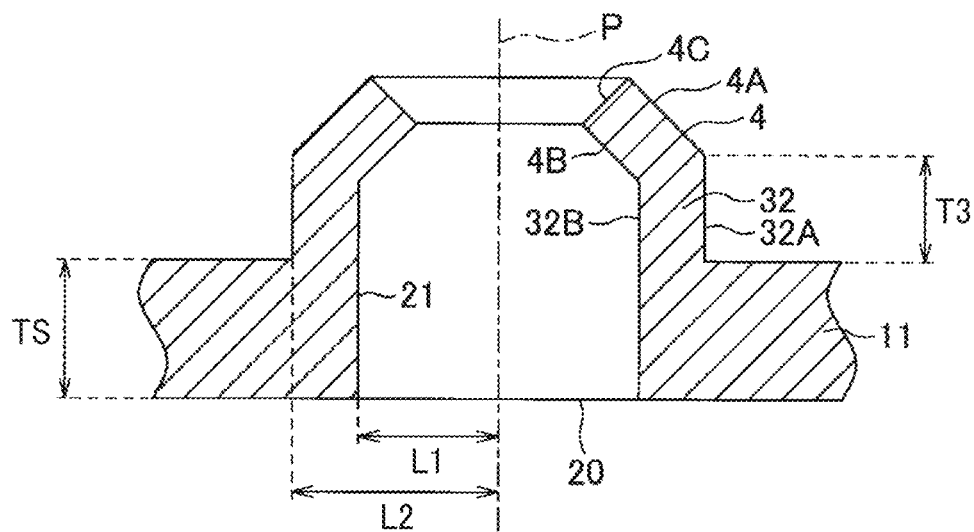
FIGS. 5A and 5B are cross-sectional views of the convex portion in a manufacturing process.
Figure 5B:
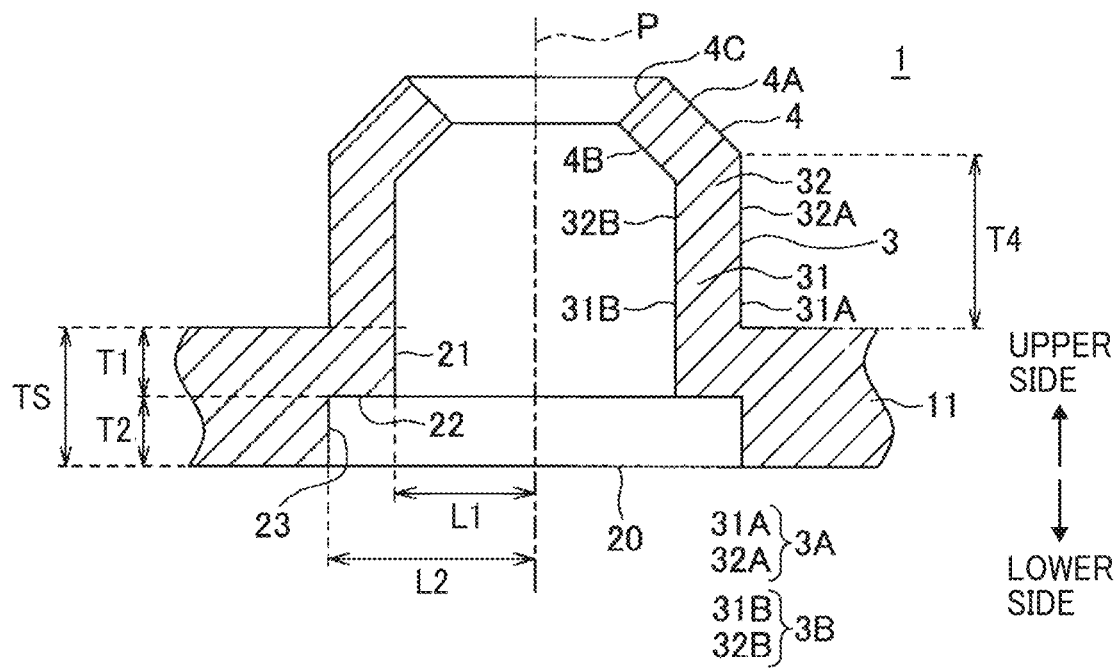

In the convex portion 1, as illustrated in FIG. 5A, a lower end surface 20 of the base 2 is subjected to burring, so that the upper body part 32 and the guide 4 are formed together with an upper cylindrical surface 21, which is described later, of the base 2. Hereinafter, the upper cylindrical surface 21, the upper body part 32, and the guide 4 may be collectively referred to as "burred portion". Then, as illustrated in FIG. 5B, the lower end surface 20 of the base 2 is sheared to form a continuous surface 22, the lower cylindrical surface 23, and the lower body part 31. Hereinafter, the continuous surface 22, the lower cylindrical surface 23, and the lower body part 31 may be collectively referred to as "sheared portion".

As illustrated in FIG. 3, the base 2 includes the upper cylindrical surface 21 (first inner circumferential surface), the continuous surface 22 (second inner circumferential surface) which is continuous with the upper cylindrical surface 21 and is perpendicular to (crosses) the erecting direction (vertical direction), and the lower cylindrical surface 23 (third inner circumferential surface). The upper cylindrical surface 21 is continuous with an inner circumferential surface 3B of the convex body 3 and extends downward (in the direction opposite the erecting direction) from the convex body 3. The upper cylindrical surface 21 is a cylindrical surface having a first radial dimension L1. The lower cylindrical surface 23 is a cylindrical surface having a second radial dimension L2 larger than the first radial dimension L1. The upper cylindrical surface 21 and the lower cylindrical surface 23 are formed coaxially with an axis P as a central axis. The continuous surface 22 is composed of a plane orthogonal to the axis P. The upper cylindrical surface 21 and the lower cylindrical surface 23 are formed so that the axial dimension T1 (the dimension in the vertical direction) of the upper cylindrical surface 21 and the axial dimension T2 (the dimension in the vertical direction) of the lower cylindrical surface 23 are substantially equal. That is, each of the axial dimension T1 of the upper cylindrical surface 21 and the axial dimension T2 of the lower cylindrical surface 23 is formed to be a half of the plate thickness TS (the dimension in the vertical direction) of the first plate portion 11.

The convex body 3 includes the lower body part 31 continuous with the upper side of the base 2 and the upper body part 32 continuous with the upper side of the lower body part 31. The guide 4 is continuous with the upper side of the upper body part 32. The lower body part 31 and the upper body part 32 are formed coaxially with the axis P as the central axis. In the lower body part 31 and the upper body part 32, a convex-body outer circumferential surface 3A is formed of a cylindrical surface having the second radial dimension L2, and the inner circumferential surface 3B of the convex body 3 is formed of a cylindrical surface having the first radial dimension L1. The convex-body outer circumferential surface 3A includes a lower outer circumferential surface 31A of the lower body part 31 and an upper outer circumferential surface 32A continuous with the upper side of the lower outer circumferential surface 31A. The inner circumferential surface 3B of the convex body 3 includes an inner circumferential surface 31B of the lower body part 31 and an inner circumferential surface 32B continuous with an upper side of the inner circumferential surface 31B.

Figure 4:
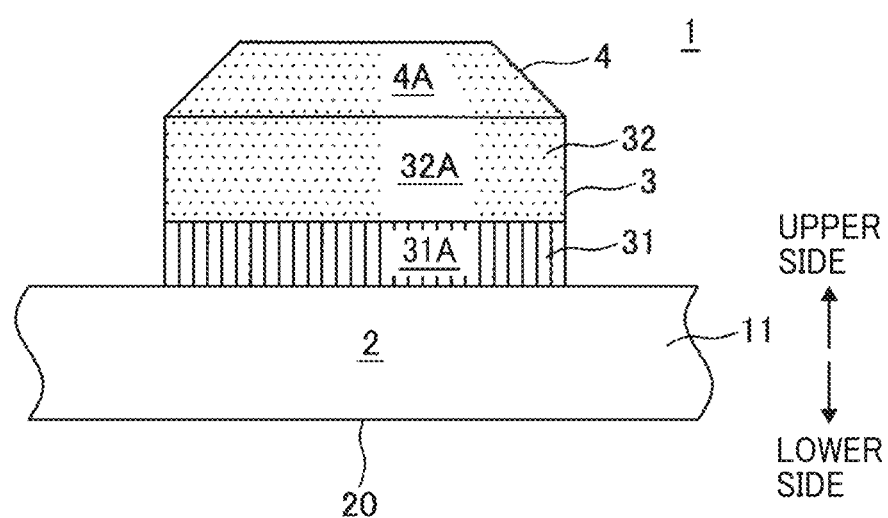
FIG. 4 is an illustration of a structure of the convex portion.

The lower body part 31 is formed by shearing the lower end surface 20 of the base 2. The lower outer circumferential surface 31A of the lower body part 31 includes a sheared surface as illustrated in FIG. 4.

The upper body part 32 is formed by burring the lower end surface 20 of the base 2. The upper outer circumferential surface 32A of the upper body part 32 includes a material surface of the first plate portion 11, as illustrated in FIG. 4.

The guide 4 includes a tapered surface 4A, a guide inner circumferential surface 4B, and an end surface 4C. The tapered surface 4A is continuous with the upper side of the upper outer circumferential surface 32A of the upper body part 32. The guide inner circumferential surface 4B is continuous with the upper side of the inner circumferential surface 32B of the upper body part 32. The end surface 4C is continuous with the tapered surface 4A and the guide inner circumferential surface 4B. The tapered surface 4A is formed to be tapered upward. Further, as illustrated in FIG. 4, the tapered surface 4A includes a material surface of the first plate portion 11. The guide inner circumferential surface 4B is formed of an inclined surface that is tapered upward.

The method of manufacturing the convex portion 1 is described with reference to FIG. 5A and FIG. 5B. First, as illustrated in FIG. 5A, the lower end surface 20 of the base 2 is subjected to burring to form the burred portion (the upper cylindrical surface 21, the upper body part 32 and the guide 4) (burring process). As illustrated in FIG. 5A, the erecting dimension (vertical dimension) T3 of the upper body part 32 is formed to be 0.75 times the plate thickness TS of the first plate portion 11. At this time, the lower body part 31 is not formed.

Then, as illustrated in FIG. 5B, the lower end surface 20 of the base 2 is sheared to form the sheared portion (the continuous surface 22, the lower cylindrical surface 23, and the lower body part 31) (shearing process). Thus, the convex portion 1 is created. In the convex portion 1, as illustrated in FIG. 5B, the erecting dimension (vertical dimension) T4 of the convex body 3 including the upper body part 32 is 1.25 times the plate thickness TS of the first plate portion 11. Thus, the convex portion 1 is completed.

The convex portion 1 manufactured in this manner is inserted into a concave portion 121 formed in the second plate portion 12 as illustrated in FIG. 1. Thus, the first plate portion 11 and the second plate portion 12 are positioned, and the positioning structure 10 is completed.

Figure 6:
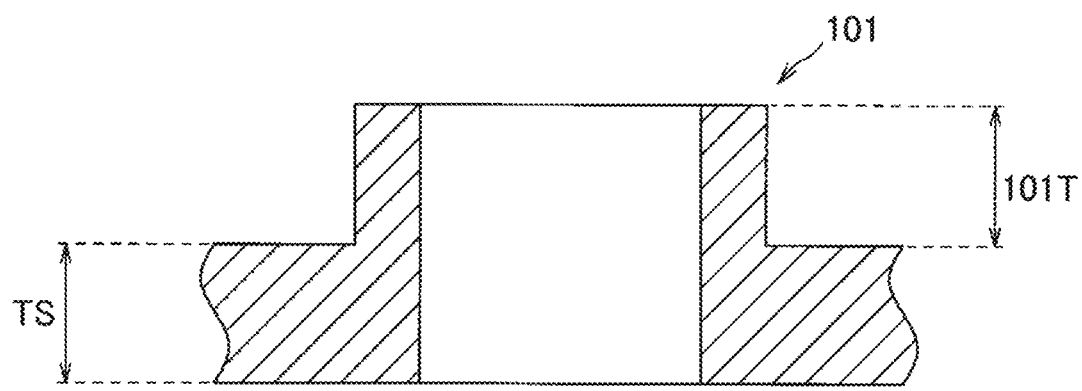
FIG. 6 is a cross-sectional view of a comparative example of a burring shape.
Figure 7:
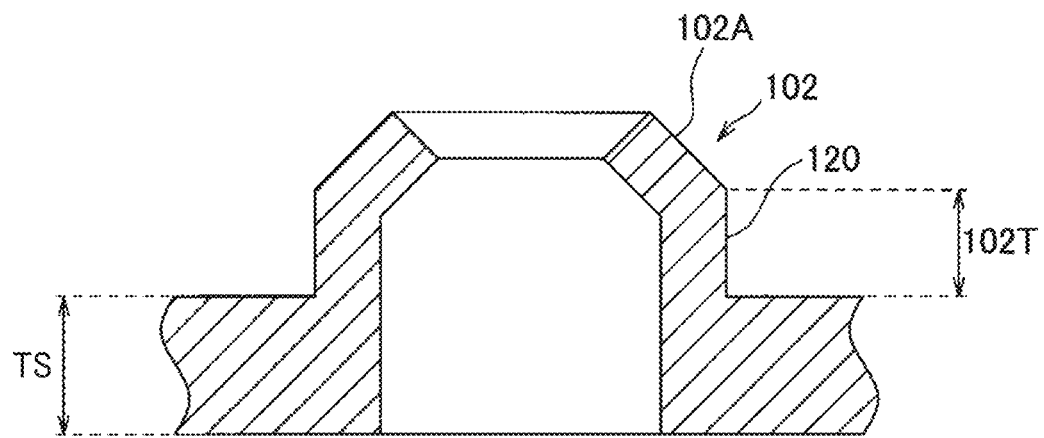
FIG. 7 is a cross-sectional view of another comparative example of a burring shape.

By the way, corrugated burring (hereinafter referred to as a burring shape) formed by burring, for example, as in a comparative example illustrated in FIG. 6, a burring shape 101 may be formed to have a cylindrical shape in which the outer diameter dimension is uniform from a base end to a top end so as to have an axial dimension (vertical dimension) 101T substantially equal to the plate thickness TS, and be used as a positioning member. The top end of the burring shape 101 becomes a fracture surface, thus reducing the workability in inserting the top end into the other hole or the concave portion. Hence, as in another comparative example illustrated in FIG. 7, a burring shape 102 may be formed so that a tapered portion 102A is formed at a top end of the burring shape 102A. Then, a cylindrical portion 120 of the burring shape 102 has an axial dimension (vertical dimension) 102T smaller than the plate thickness TS by the axial dimension of the tapered portion 102A. When the burring shape 102 is inserted into the hole or the concave portion, the insertion of the burring shape 102 into the hole or the concave portion becomes shallow. Accordingly, after the burring shape 102 is inserted into and positioned in the hole or the concave portion, the burring shape 102 may come out of the hole or the concave portion.

Hence, according to the above-described embodiment, the lower end surface 20 of the base 2 is first subjected to burring to form the lower body part (convex base part) 31 and the guide 4 together with the upper cylindrical surface 21. Then, shearing is performed to form the lower body part 31 (convex base part) together with the continuous surface 22 and the lower cylindrical surface 23. That is, by forming the lower body part 31 by shearing after burring, the convex portion 1 has the guide 4 at a top end of the convex portion 1 can reliably obtain the vertical dimension T4 of the convex body 3. Thus, without impairing the workability, it is possible to prevent the convex portion 1 from slipping out the concave portion 121 after the convex portion 1 is inserted into and positioned in the concave portion 121 of the second plate portion 12.

Further, the vertical dimension T4 of the convex body 3 is formed to be larger than the thickness TS of the base 2. Such a configuration can further reduce the positional deviation of the first plate portion 11 and the second plate portion 12 due to the convex portion 1 coming out of the concave portion 121 of the second plate portion 12.

The convex body 3 includes the lower body part (convex base part) 31 continuous with the base 2 and the upper body part (convex top part) 32 continuous with the lower body part 31. The lower outer circumferential surface 31A includes a sheared surface. The upper outer circumferential surface 32A and the tapered surface 4A of the guide 4 include the material surface of the first plate portion 11. Such a configuration allows the convex portion 1 to secure the vertical dimension T4 of the convex body 3 while having the guide 4 at the top end. Thus, without impairing the workability, it is possible to prevent the convex portion 1 from slipping out the concave portion 121 after the convex portion 1 is inserted into and positioned in the concave portion 121 of the second plate portion 12.

The guide 4 has the tapered surface 4A that is tapered in a direction away from the convex body 3. With such a configuration, forming the guide 4 can suppress the loss of workability in inserting the convex portion 1 into the concave portion 121 of the second plate portion 12.

Embodiments of the present disclosure are not limited to the above-described embodiments and various modifications and variations are possible, for example, as described below.

In the above-described embodiment, the second plate portion 12 includes the concave portion 121 into which the convex portion 1 is insertable. However, embodiments of the present disclosure are not limited to the above-described embodiment. The second plate portion may have a hole into which the convex portion 1 is insertable.

In the above-described embodiment, the guide 4 has the tapered surface 4A that is tapered upward. Embodiments of the present disclosure are not limited to the above-described embodiment. The guide 4 may have, for example, a cylindrical surface above the tapered surface 4A. That is, as long as the guide 4 has the tapered surface 4A, the guide 4 may have a different form from the above-described embodiment.

Although the present disclosure has been particularly illustrated and described primarily with respect to particular embodiments, it will be apparent to those embodiments described above without departing from the spirit and scope of the present disclosure. Those skilled in the art can make various modifications in terms of shape, material, quantity, and other detailed configurations. Therefore, the description with the above-described disclosure of the shape, the material, etc. is exemplarily described for facilitating the understanding of the present disclosure, and is not intended to limit the present disclosure. The description in the name of a member from which some or all of the limitations such as the limitation have been removed is included in the present disclosure.

The invention claimed is:

1. A convex portion projecting from a plate member, the convex portion comprising:
   a base being part of the plate member,
   a convex body erecting in a cylindrical shape from the base; and
   a guide at a top end of the convex body,
   the base including:
      a first inner circumferential surface that is continuous with an inner circumferential surface of the convex body and extends in a direction opposite to an erecting direction of the convex body;
      a second inner circumferential surface that is continuous with the first inner circumferential surface and intersects the erecting direction of the convex body; and
      a third inner circumferential surface that is continuous with the second inner circumferential surface and is larger in diameter than the first inner circumferential surface, and the convex body is above the third inner circumferential surface,
      a diameter of an outer circumferential surface of the convex body is equal to a diameter of the third inner circumferential surface.

2. The convex portion according to claim 1, wherein a dimension of the convex body in the erection direction is larger than a plate thickness of the base.

3. The convex portion according to claim 1, wherein the convex body includes a convex base part continuous with the base and a convex top part continuous with the convex base part and the guide, wherein an outer circumferential surface of the convex base part includes a sheared surface, wherein an outer circumferential surface of the convex top part and the guide includes a material surface of the plate member.

4. The convex portion according to claim 1,
wherein the guide has a tapered surface that is tapered in a direction away from the convex body.

5. A positioning structure comprising:
a first plate portion being the plate member including the convex portion according to claim 1; and
a second plate portion including a hole or a concave portion in which the convex portion fits.

6. A method of manufacturing the convex portion of claim 1, the convex body including a convex base part continuous with the base and a convex top part continuous with the convex base part and the guide,
the method comprising:
burring the plate member to form the convex top part and the guide; and shearing the plate member to form the convex base part.

7. The convex portion according to claim 1,
wherein the guide has an end surface such that an interior of the convex body is exposed, the guide being angled inward relative to the convex body.

8. The convex portion according to claim 7,
wherein a dimension of the convex body in the erection direction is larger than a plate thickness of the base.

9. The convex portion according to claim 7,
wherein the convex body includes a convex base part continuous with the base and a convex top part continuous with the convex base part and the guide,
wherein an outer circumferential surface of the convex base part includes a sheared surface,
wherein an outer circumferential surface of the convex top part and the guide includes a material surface of the plate member.

10. The convex portion according to claim 7,
wherein the guide has a tapered surface that is tapered in a direction away from the convex body.

11. A positioning structure comprising:
a first plate portion being the plate member including the convex portion according to claim 7; and
a second plate portion including a hole or a concave portion in which the convex portion fits.

* * * * *